Aug. 23, 1932.  A. J. GINSBERG  1,873,758
CAMERA LENS AND FILTER MOUNT
Filed Nov. 25, 1930   2 Sheets-Sheet 1

WITNESSES
Edw. Thorpe
S.W. Focker

INVENTOR
Abraham J. Ginsberg
BY
ATTORNEY

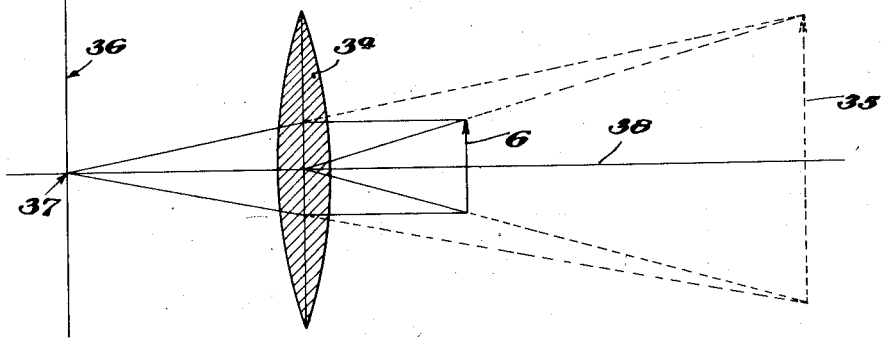
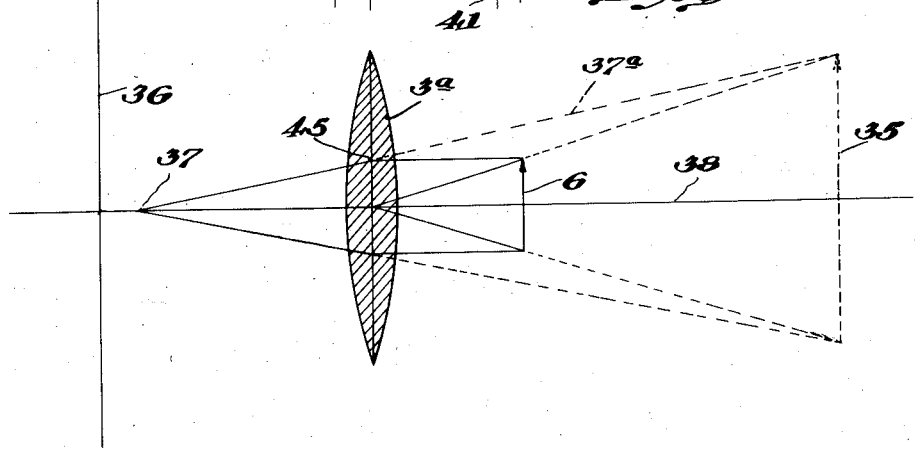

Patented Aug. 23, 1932

1,873,758

UNITED STATES PATENT OFFICE

ABRAHAM J. GINSBERG, OF NEW YORK, N. Y.

CAMERA LENS AND FILTER MOUNT

Application filed November 25, 1930. Serial No. 498,122.

This invention relates to an improved camera lens and filter mount which may be used in connection with any camera, although it is especially adapted for use in connection with motion picture cameras having filters for color photography.

The primary object of the invention is to provide a device of this character in which through all adjustments a proper pre-determined relationship is maintained between the objective and the filter, which adjustment varies with the focus of the lens, or to express this same object mechanically I provide means whereby the distance between the virtual image and the film plane when focusing the lens from infinity to various closer distances maintains a definite relationship.

More specifically, the invention consists in providing a filter mount which is caused to move longitudinally at the same time the lens is focused, but the distance of the movement of the filter mount differs from the distance of movement of the lens mount.

I am, of course, aware that heretofore provision has been made for fixed relationship between the objective and the filter during adjustment, but this fixed relationship is based upon an average adjustment, and best results can only be accomplished when there is a variable movement which is pre-determined. This variable movement I am enabled to accomplish through the mechanism of my improved device.

With these and other objects in view, the invention consists in certain novel features of construction and combinations and arrangements of parts, all of which will be more fully hereinafter described and pointed out in the claims.

In the accompanying drawings—

Figure 8 shows more or less diagrammatically the initial position of the lens and a filter employed in my apparatus; and Figure 9 is a diagram similar to Figure 8 showing the relative position of the lens and filter after these elements have been moved a predetermined distance.

Figure 1:
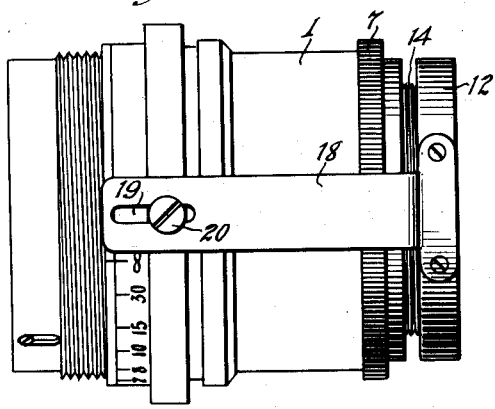
Figure 1 is a top plan view of my improved camera lens and filter mount.
Figure 2:
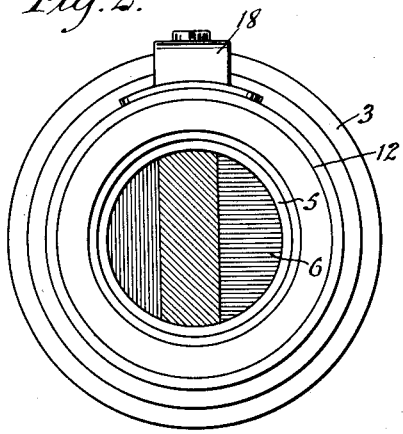
Figure 2 is a front end elevation of Figure 1.
Figure 3:
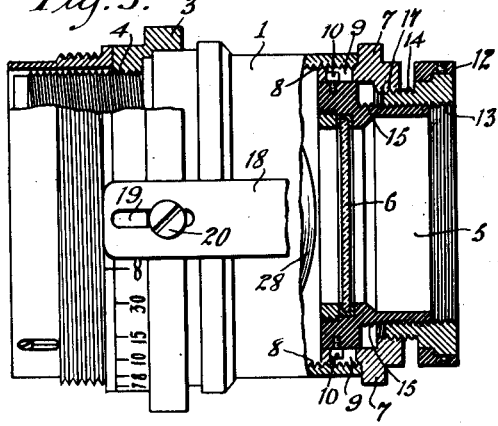
Figure 3 is a view similar to Figure 1, with parts in section and parts broken away, illustrating in detail the filter mount.
Figure 5:
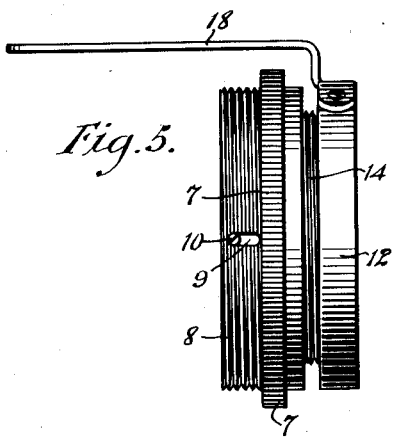
Figure 5 is a view in elevation of the filter mount detached.
Figure 4:
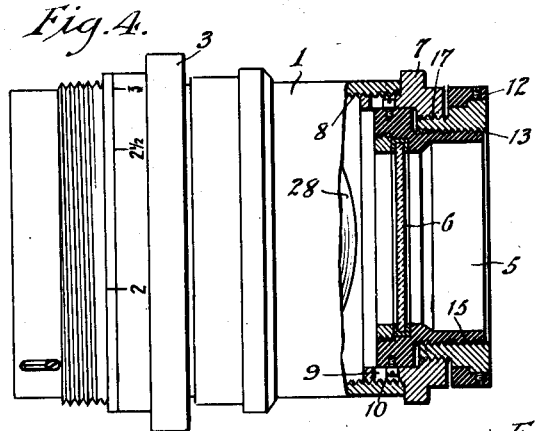
Figure 4 is a view similar to Figure 3 but showing the filter mount in a different position.
Figure 6:
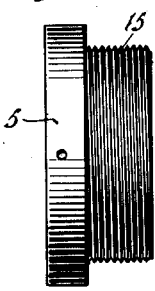
Figure 6 is a view in elevation of the filter barrel.

It is to be distinctly understood that my invention is not limited to any specific construction of lens mount, as the lens mount is capable of variation, the only essential being that the lens mount is capable of adjustment for focusing and adapted for use in connection with my improved filter mount and the adjusting mechanism therefor.

1 represents a lens barrel in which the lens or objective 2 is mounted, and adjustment thereof is effected through the medium of a focusing ring 3 having screw-threaded engagement with the barrel, as indicated at 4, so that when the ring is turned the lens is focused as is customary in the art.

5 represents my improved filter mount having a filter 6 therein supported in any approved manner and, as above stated, this filter, while it may be of any color or form, is preferably of a plurality of colors such as used in color photography.

This filter mount 5 is adapted to move longitudinally in the forward end of the barrel 1 but is held against turning movement. To accomplish this result I provide a fixed ring 7 which has screw-threaded engagement with internal threads at the forward end of the barrel 1, as indicated at 8, and is provided with longitudinal slots 9 in which the heads of screws 10, mounted in the inner portion of the filter barrel 5, project.

12 represents an adjusting ring which has internal and external screw threads 13 and 14 respectively. The internal screw threads 13 mesh with external screw threads 15, on the filter barrel 5, and the external screw threads 14 mesh with internal screw threads 17 in the fixed ring 7.

The adjusting ring 12 is illustrated as two members having fixed relation but, of course, the invention is not limited in this respect. It will be readily understood that when the adjusting ring 12 is turned it will cause a longitudinal movement of the filter mount 5, which is somewhat compounded by the arrangement of screw threads, as above indicated.

An arm or bar 18 connects the focus adjusting ring 3 with the filter barrel adjusting ring 12 so as to cause these rings to turn together but permit of a variation in longitudinal movement of one ring relative to the other. To permit this result I have illustrated the arm or bar 18 as rigidly secured to the ring 12 and having a longitudinal slot 19 therein receiving a screw 20 screwed into the ring 3.

It is to be understood that the screw threads 4 have a different pitch from the screw threads 13 and 14 of the filter barrel, so that when the focusing ring is turned it imparts longitudinal adjustment to both the objective and the filter, but the distance of movement of the filter varies from the distance of movement or adjustment of the objective.

In providing this difference in movement, although simultaneous adjustment of lens and filter, I maintain a definite relationship of distance between the virtual image and the filter plane when focusing the lens from infinity to various closer distances.

Figure 7:
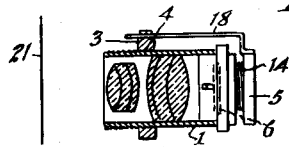
Figure 7 is a small diagrammatic view illustrating my invention.

In Figure 7 I illustrate the invention diagrammatically, the reference character 21 indicating the film and the other parts of the diagram having the same reference characters as employed in describing the construction of the device.

Referring to the diagram shown in Figure 8 a lens 3ª is shown spaced a definite distance from the filter 6 with the filter being located between the principal focus of the lens and said lens so that a virtual image 35 will appear in the position indicated in the dotted line, the film plane being indicated by the lines 36. The optical axis 37 of the lens 3ª is located in the film plane, as shown in Fig. 8. A definite distance between the film plane 36 and the virtual image 35 is measured by a line 38 and this distance is maintained uniform during the various adjustments of the lens 3ª and the filter 6.

In Figure 9 the lens 3ª is shown as having been adjusted a distance measured by the space between the lines 39 and 40 directly above the lens 3ª so that a line 37ª drawn from the virtual image through the point 45 will cut the principal axis 38 at 37 and inwardly of the film plane 36.

The filter 6 has likewise been moved longitudinally and axially of the camera but at a less distance than the linear movement of the lens 3ª as indicated by the space between the lines 41 and 42. In other words, while the lens 3ª due to the necessity of focusing the same, has been moved a predetermined distance longitudinally of the barrel 1, the filter 6 has likewise been moved forwardly and in the same direction, but at a distance to maintain the distance measured by the line 38 between the film plane 36 and the virtual image 35, the same as it is indicated in Figure 8. In other words, whenever the lens is adjusted the filter 6 must likewise be adjusted during the differential adjustments between the lens and the filter, the distance between the film plane 36 and the virtual image 35 must be the same.

In the simplest explanation of the invention we will assume that the screw threads 4 of the focus adjusting ring 3 have a greater pitch than the screw threads 15 of the filter mount 5, so that when the ring 3 is turned to properly focus the lens the filter adjusting ring 12 will also be turned but a distance varying or differing from the distance of lineal movement of the lens adjustment, so that in all adjustments of the lens the filter will be properly positioned and not have a fixed relationship, as has heretofore been common practice in this art.

While I have illustrated what I believe to be the preferred embodiment of my invention, it is to be distinctly undertood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A device of the character described including a barrel, a focusing lens in the barrel, an adjusting ring having screw threaded engagement with the barrel and adapted to adjust the lens to focus the same, a filter mount having screw threaded engagement with the barrel, a multi-color filter in the mount said last mentioned threaded engagement including threads of a pitch differing from the threads of the focusing ring, and means operatively connecting the focusing ring and filter mount, so that when the lens is adjusted a predetermined distance along the barrel, the filter will be similarly moved but through a less distance than the lens.

2. A device of the character described including a barrel, a focusing lens in the barrel, an adjusting ring having screw threaded engagement with the barrel and adapted to adjust the lens to focus the same, a filter mount having screw threaded engagement with the barrel, a multi-color filter in the mount said last mentioned threaded engagement including threads of a pitch differing from the threads of the focusing ring, means operatively connecting the focusing ring and filter mount, a bar having fixed relation to the filter adjusting means, and having slot and pin connection with the focus adjusting ring, so that when the lens is adjusted a predetermined distance along the barrel, the filter will be similarly moved but through a less distance than the lens.

3. A device of the character described, including a barrel, focusing lens in the barrel, a focusing ring on the barrel operatively connected to the lens, a filter mount in the end of the barrel, a multi-color filter in said filter mount, a filter adjusting ring having screw-threaded engagement with the filter mount and with the fixed part of the barrel, the screw-threaded engagement between the ring and filter mount differing in pitch from the threads of the focusing ring and means connecting the adjusting means of the lens and the filter mount, so that when the lens is adjusted a predetermined distance along the barrel the filter will be moved similarly but through a less linear distance than the lens.

4. An apparatus for color photography having a film plane and including a lens and a multi-color filter arranged in alignment together with means for compelling the lens and the filter to adjust together and cause one to move a greater distance than the other in order to maintain at all times a uniform distance between the film plane and the virtual image of the filter.

5. A device of the character described including a support, a focussing lens mounted for movement longitudinally of the support, a filter mounted for longitudinal movement of the support, means connecting the lens and the filter together to compel longitudinal movements of the lens and filter in the same direction when one of the members is moved, and means for causing differential longitudinal movements of the lens and filter.

6. A device of the character described including a support, a focusing lens mounted for movement longitudinally of the support, a filter mounted for movement longitudinally of the support, means connecting the lens and filter together to provide for a simultaneous longitudinal movement of both the lens and the filter, and means for causing the filter to move at a different rate of speed from the lens when the lens and filter are moved.

7. A device of the character described having film plane comprising a support, a focusing lens mounted for longitudinal movement of the support, a filter mounted for movement longitudinally of the support, means connecting the lens and filter together to provide for simultaneous longitudinal movements of the lens and the filter, said last-mentioned means including means to permit relative movement between the lens and the filter when both the filter and the lens are moved so that the filter will move at a different rate of speed from the lens in order to maintain at all times a uniform distance between the film plane and the virtual image of the filter.

ABRAHAM J. GINSBERG.